United States Patent
Svendsen et al.

(10) Patent No.: US 12,307,314 B2
(45) Date of Patent: May 20, 2025

(54) ADAPTIVE CONFIGURATION OF MULTISTATIC TAG BACKSCATTER

(71) Applicant: Nokia Technologies Oy, Espoo (FI)

(72) Inventors: Simon Svendsen, Aalborg (DK); Johannes Harrebek, Aalborg (DK); Benny Vejlgaard, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 177 days.

(21) Appl. No.: 18/366,336

(22) Filed: Aug. 7, 2023

(65) Prior Publication Data
US 2024/0078404 A1 Mar. 7, 2024

(30) Foreign Application Priority Data

Sep. 2, 2022 (GB) ..................... 2212811

(51) Int. Cl.
*G06K 19/077* (2006.01)
*G06K 7/10* (2006.01)
*G06K 19/07* (2006.01)

(52) U.S. Cl.
CPC ... *G06K 19/07713* (2013.01); *G06K 7/10425* (2013.01); *G06K 19/0726* (2013.01)

(58) Field of Classification Search
CPC ......... G06K 19/07713; G06K 7/10425; G06K 19/0726
See application file for complete search history.

(56) References Cited

U.S. PATENT DOCUMENTS 8,188,908 B2 5/2012 Landt
8,319,636 B2 * 11/2012 Brommer ............... G06K 17/00
340/572.1

(Continued)

FOREIGN PATENT DOCUMENTS

| CN | 105723684 B | 3/2019 |
| TW | I530120 B | 4/2016 |
| WO | 2021/112649 A1 | 6/2021 |

OTHER PUBLICATIONS

"3rd Generation Partnership Project; Technical Specification Group Radio Access Network; NR; Physical channels and modulation (Release 17)", 3GPP TS 38.211, V17.2.0, Jun. 2022, pp. 1-136.

(Continued)

*Primary Examiner* — Chico A Foxx
(74) *Attorney, Agent, or Firm* — Nokia Technologies Oy

(57) ABSTRACT

Embodiments of the present disclosure relate to methods, devices and computer readable media for adaptive configuration of multistatic harmonic tag backscatter. A network device transmits, to an illuminator for a passive tag, a request for transmitting an activation signal to a passive tag at a primary frequency and a first transmission power. The network device receives, from the illuminator, information about a harmonic frequency of a harmonic of the activation signal back-scattered from the passive tag, a received level of the harmonic and a distance between the illuminator and the passive tag. The network device selects at least one reader for the passive tag. The network device configures the illuminator to transmit the activation signal to the passive tag at the primary frequency. The network device configures the at least one reader to receive the harmonic of the activation signal at the harmonic frequency.

8 Claims, 14 Drawing Sheets

(56) References Cited

U.S. PATENT DOCUMENTS

| | | | |
|---|---|---|---|
| 8,432,253 | B2 | 4/2013 | Ainsbury et al. |
| 9,645,234 | B2 | 5/2017 | Khan et al. |
| 10,382,161 | B2* | 8/2019 | Gollakota ............. H02J 50/001 |
| 10,423,809 | B2 | 9/2019 | Berge et al. |
| 2006/0022815 | A1* | 2/2006 | Fischer ............. G06K 7/10356 340/505 |
| 2007/0096875 | A1* | 5/2007 | Waterhouse ..... G06K 19/07749 340/572.1 |
| 2008/0174410 | A1 | 7/2008 | Sarangapani et al. |
| 2013/0120119 | A1 | 5/2013 | Calvarese |
| 2017/0098149 | A1* | 4/2017 | Kesler ..................... H02J 50/12 |
| 2021/0012071 | A1* | 1/2021 | Lopez ................ G06K 7/10029 |
| 2021/0279433 | A1* | 9/2021 | Kan ......................... H04B 5/79 |
| 2021/0373111 | A1 | 12/2021 | Hui et al. |
| 2024/0380529 | A1* | 11/2024 | Elshafie .................. H04L 5/001 |

OTHER PUBLICATIONS

"3rd Generation Partnership Project; Technical Specification Group Radio Access Network; NR; Physical layer procedures for control (Release 17)", 3GPP TS 38.213, V17.2.0, Jun. 2022, pp. 1-256.

"Moderator's summary of Discussion [RAN94e-R18Prep-28] Passive IoT", 3GPP TSG RAN#94e, RP-212688, Agenda: 8A.5, Ericsson, Dec. 6-17, 2021, pp. 1-45.

Vera et al., "Third Harmonic Exploitation in Passive UHF RFID", IEEE Transactions on Microwave Theory and Techniques, vol. 63, No. 9, Sep. 2015, pp. 2991-3004.

Lin et al., "Battery-Less IoT Sensor Node with PLL-Less WiFi Backscattering Communications in a 2.5-µW Peak Power Envelope", Symposium on VLSI Circuits, Jun. 13-19, 2021, pp. 1-2.

Chen et al., "Reliable and Practical Bluetooth Backscatter With Commodity Devices", IEEE/ACM Transactions on Networking, vol. 29, No. 4, Aug. 2021, pp. 1717-1729.

Lyu et al., "A UHF/UWB Hybrid RFID Tag With a 51-m Energy-Harvesting Sensitivity for Remote Vital-Sign Monitoring", IEEE Transactions on Microwave Theory and Techniques, vol. 68, No. 11, Nov. 2020, pp. 4886-4895.

Tang et al., "Self-Sustainable Long-Range Backscattering Communication Using RF Energy Harvesting", IEEE Internet of Things Journal, vol. 8, No. 17, Sep. 1, 2021, pp. 13737-13749.

"Msc-generator", Sourceforge, Retrieved on Aug. 11, 2023, Webpage available at : https://sourceforge.net/projects/msc-generator/.

"3rd Generation Partnership Project; Technical Specification Group Radio Access Network; NR; Physical layer procedures for data (Release 17)", 3GPP TS 38.214, V17.2.0, Jun. 2022, pp. 1-228.

Ma, "Indoor Locating by Broadband Harmonic RF Backscatter", Dissertation, May 2016, 142 pages.

Search Report received for corresponding United Kingdom Patent Application No. 2212811.0, dated Feb. 27, 2023, 2 pages.

* cited by examiner

ADAPTIVE CONFIGURATION OF MULTISTATIC TAG BACKSCATTER

RELATED APPLICATION

This application claims priority from UK Application No.: 2212811.0 filed on Sep. 2, 2022, which is hereby incorporated in its entirety.

TECHNICAL FIELD

Implementations of the present disclosure generally relate to the field of telecommunication, and in particular, to devices, methods and computer readable media for adaptive configuration of multistatic tag backscatter.

BACKGROUND

Regarding Internet of Things (IoT) applications, the Third Generation Partnership Project (3GPP) has specified Narrow Band Internet of Things (NB-IoT), enhanced Machine-Type Communication (eMTC) and NR reduced capabilities (Red-Cap) before Release 18 to satisfy the requirements on low cost and low power devices for wide area IoT communication. These IoT devices usually consume tens or hundreds of milliwatts power during transceiving while the cost is a few dollars. However, to achieve the internet of everything, IoT devices with ten or even a hundred times lower cost and power consumption are needed, especially for a large number of applications requiring batteryless devices.

SUMMARY

In general, example implementations of the present disclosure provide devices, methods and computer readable media for adaptive configuration of multistatic tag backscatter session.

In a first aspect, there is provided a first network device. The network device comprises at least one processor and at least one memory including computer program codes. The at least one memory and the computer program codes are configured to, with the at least one processor, cause the network device to: transmit, to an illuminator for a passive tag, a request for transmitting an activation signal to the passive tag at a primary frequency and a first transmission power; receive, from the illuminator for the passive tag, information about a harmonic frequency of a harmonic of the activation signal back-scattered from the passive tag, a received level of the harmonic and a distance between the illuminator for the passive tag and the passive tag, the received level of the harmonic being associated with a transmission power of the activation signal; select at least one reader for the passive tag which is expected to be within reach of the harmonic of the activation signal back-scattered from the passive tag based on a position of the illuminator for the passive tag, the received level of the harmonic and the distance; configure the illuminator for the passive tag to transmit the activation signal to the passive tag at the primary frequency and with a transmission power ensuring maximum harmonic generation at the passive tag; and configure the at least one reader for the passive tag to receive the harmonic of the activation signal at the harmonic frequency.

In a second aspect, there is provided an illuminator for a passive tag. The illuminator for the passive tag comprises at least one processor and at least one memory including computer program codes. The at least one memory and the computer program codes are configured to, with the at least one processor, cause the illuminator for the passive tag to: transmit an activation signal to a passive tag at a primary frequency and a first transmission power based on a request received from a network device; monitor, from the passive tag, a response to the activation signal at frequencies of harmonics of the activation signal; select one of the harmonics with a highest received level; determine a received level of the selected harmonic, the received level being associated with a transmission power of the activation signal; determine a distance between the illuminator for the passive tag and the passive tag; transmit, to the network device, information about a harmonic frequency of the selected harmonic, the received level of the selected harmonic and the distance; receive, from the network device, configuration for position estimation of the passive tag; and transmit, based on the configuration, the activation signal to the passive tag at the primary frequency and with a transmission power ensuring maximum harmonic generation at the passive tag for position estimation of the passive tag.

In a third aspect, there is provided a reader for the passive tag. The reader for the passive tag comprises at least one processor and at least one memory including computer program codes. The at least one memory and the computer program codes are configured to, with the at least one processor, cause the reader for the passive tag to: receive, from a network device, configuration for position estimation of a passive tag; receive, at a harmonic frequency, a harmonic of an activation signal back-scattered from the passive tag, the configuration indicating the harmonic frequency; and transmit, to the network device, measurement results of the harmonic for position estimation of the passive tag.

In a fourth aspect, there is provided a method implemented at a network device. The method comprises: transmitting, to an illuminator for the passive tag, a request for transmitting an activation signal to a passive tag at a primary frequency and a first transmission power; receiving, from the illuminator for the passive tag, information about a harmonic frequency of a harmonic of the activation signal back-scattered from the passive tag, a received level of the harmonic and a distance between the illuminator for the passive tag and the passive tag, the received level of the harmonic being associated with a transmission power of the activation signal; selecting at least one reader for the passive tag which is expected to be within reach of the harmonic of the activation signal back-scattered from the passive tag based on a position of the illuminator for the passive tag, the received level of the harmonic and the distance; configuring the illuminator for the passive tag to transmit the activation signal to the passive tag at the primary frequency and with a transmission power ensuring maximum harmonic generation at the passive tag; and configuring the at least one reader for the passive tag to receive the harmonic of the activation signal at the harmonic frequency.

In a fifth aspect, there is provided a method implemented at an illuminator for the passive tag. The method comprises: transmitting an activation signal to a passive tag at a primary frequency and a first transmission power based on a request received from a network device; monitoring, from the passive tag, a response to the activation signal at frequencies of harmonics of the activation signal; selecting one of the harmonics with a highest received level; determining a received level of the selected harmonic, the received level being associated with a transmission power of the activation signal; determining a distance between the illuminator for the passive tag and the passive tag; transmitting, to the network device, information about a harmonic frequency of the selected harmonic, the received level of the selected harmonic and the distance; receiving, from the network device, configuration for position estimation of the passive tag; and transmitting, based on the configuration, the activation signal to the passive tag at the primary frequency and with a transmission power ensuring maximum harmonic generation at the passive tag for position estimation of the passive tag.

In a sixth aspect, there is provided a method implemented at a reader for the passive tag. The method comprises: receiving, from a network device, configuration for position estimation of the passive tag; receiving, at a harmonic frequency, a harmonic of an activation signal back-scattered from the passive tag, the configuration indicating the harmonic frequency; and transmitting, to the network device, measurement results of the harmonic for position estimation of the passive tag.

In a seventh aspect, there is provided an apparatus. The apparatus comprises means for performing the following: transmitting, to a illuminator for the passive tag, a request for transmitting an activation signal to a passive tag at a primary frequency and a first transmission power; receiving, from the illuminator for the passive tag, information about a harmonic frequency of a harmonic of the activation signal back-scattered from the passive tag, a received level of the harmonic and a distance between the illuminator for the passive tag and the passive tag, the received level of the harmonic being associated with a transmission power of the activation signal; selecting at least one reader for the passive tag which is expected to be within reach of the harmonic of the activation signal back-scattered from the passive tag based on a position of the illuminator for the passive tag, the received level of the harmonic and the distance; configuring the illuminator for the passive tag to transmit the activation signal to the passive tag at the primary frequency and with a transmission power ensuring maximum harmonic generation at the passive tag; and configuring the at least one reader for the passive tag to receive the harmonic of the activation signal at the harmonic frequency.

In an eighth aspect, there is provided an apparatus. The apparatus comprises means for performing the following: transmitting an activation signal to a passive tag at a primary frequency and a first transmission power based on a request received from a network device; monitoring, from the passive tag, a response to the activation signal at frequencies of harmonics of the activation signal; selecting one of the harmonics with a highest received level; determining a received level of the selected harmonic, the received level being associated with a transmission power of the activation signal; determining a distance between the illuminator for the passive tag and the passive tag; transmitting, to the network device, information about a harmonic frequency of the selected harmonic, the received level of the selected harmonic and the distance; receiving, from the network device, configuration for position estimation of the passive tag; and transmitting, based on the configuration, the activation signal to the passive tag at the primary frequency and with a transmission power ensuring maximum harmonic generation at the passive tag for position estimation of the passive tag.

In a ninth aspect, there is provided an apparatus. The apparatus comprises means for performing the following: receiving, from a network device, configuration for position estimation of a passive tag; receiving, at a harmonic frequency, a harmonic of an activation signal back-scattered from the passive tag, the configuration indicating the harmonic frequency; and transmitting, to the network device, measurement results of the harmonic for position estimation of the passive tag.

In a tenth aspect, there is provided a non-transitory computer readable medium. The non-transitory computer readable medium comprises program instructions for causing an apparatus to perform the method according to any of the fourth, fifth and sixth aspects.

It is to be understood that the summary section is not intended to identify key or essential features of implementations of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some implementations of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1A:
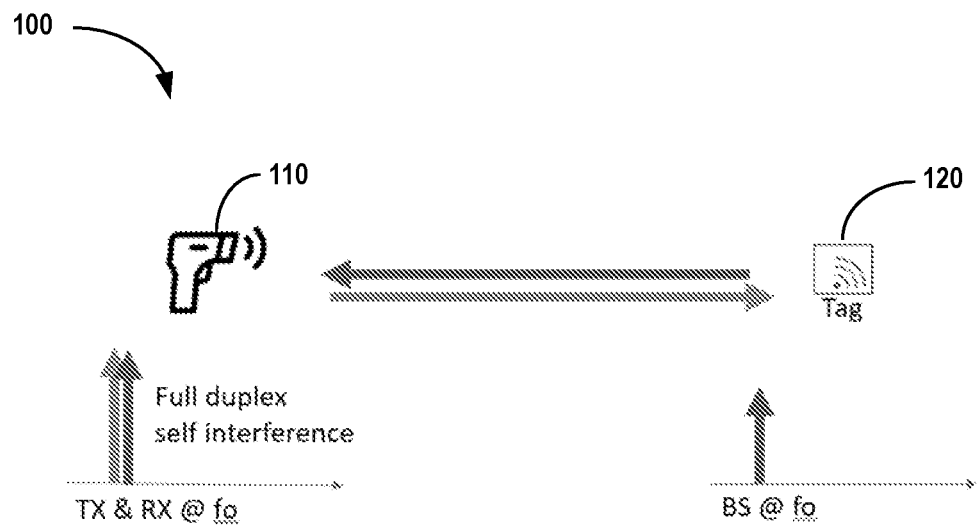
FIG. 1A illustrates a schematic diagram of a Radio Frequency Identification (RFID) system.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
(a) hardware-only circuit implementations (such as implementations in only analog and/or digital circuitry)
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, a core network device (such as LMF) and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "passive tag" refers to a batteryless tag. The passive tag may be powered by harvesting energy from environments.

As described above, to achieve the internet of everything, IoT devices with ten or even a hundred times lower cost and power consumption are needed, especially for a large number of applications requiring batteryless devices.

Typical Use Cases

The number of IoT connections has been growing rapidly in recent years and is predicted to be hundreds of billions by 2030. With more and more 'things' expected to be interconnected for improving production efficiency and increasing comforts of life, it demands further reduction of size, cost, and power consumption for IoT devices. In particular, regular replacement of battery for all the IoT devices is impractical due to the tremendous consumption of materials and manpower. It has become a trend to use energy harvested from environments to power IoT devices for self-sustainable communications, especially in applications with a huge number of devices (e.g., ID tags and sensors).

3GPP Technologies

The most critical issue with existing 3GPP technologies for the target use cases is the capability of cooperating with energy harvesting considering limited device size. Cellular devices usually consume tens or even hundreds of milliwatts power for transceiving processing. Taking NB-IoT module for example, the typical current consumption for receive processing is about 60 mA with supply voltage higher than 3.1V, while 70 mA for transmitting processing at 0 dBm transmit power. The output power provided by typical energy harvester is mostly below 1 milliwatt, considering the small size of a few square centimeters for practical devices. Since the available power is far less than the consumed power, it is impractical to power cellular devices directly by energy harvesting in most cases.

One possible solution is to integrate energy harvesting with rechargeable battery or supercapacitor. However, there are still a few problems to be solved. Firstly, both rechargeable battery and supercapacitor may suffer from shortened lifetime in practical cases. It is hard to provide constant charging current or voltage by energy harvesting, while longtime continuous charging is needed due to the very small output power from energy harvester. Inconstant charging current and longtime continuous charging are both harmful to battery life. For supercapacitor, its lifetime will be significantly reduced in high temperature environments (e.g., less than 3 years at 50 degrees centigrade). Secondly, device size will be significantly increased. As small size button battery can only provide current of a few tens of milliamps, battery with much larger size (e.g., AA battery) is usually used to power cellular devices, whose size can be even larger than the module itself. To store energy for a proper duration of working (e.g., one second), the required capacitance of a supercapacitor is at the level of a hundred mill-farads. The size of such supercapacitors may be larger than an NB-IoT module. Thirdly, both rechargeable batteries and supercapacitors can be more expensive than the module itself. Even purchased in large quantities, the cost of a suitable battery or supercapacitor may reach one or a few dollars, which nearly doubles the cost of the device.

Non-3GPP Technologies

RFID is the most well-known technology supporting battery less tags (devices). The power consumption of commercial passive RFID tags can be as low as 1 microwatt. The key techniques enabling such low power consumption are envelope detection for downlink data reception, and backscatter communication for uplink data transmission. RFID is designed for short-range communications, whose typical effective range is less than 10 meters. As the air interface of RFID almost remains unchanged since 2005, the too-simple transmission scheme becomes the obstacle of improving its link budget and capability of supporting scalable network.

Attracted by the extremely low power consumption of backscatter communication, many non-3GPP technologies begin to put efforts into related research, such as Wi-Fi, Bluetooth, UWB, and LORA. Various research shows that a few or tens of microwatts power consumption can be supported for passive tags based on or with small modifications to the above air interfaces. A significant proportion of the studies are targeting at long range communication. Among them, a LORA tag implemented with commercial off-the-shelf components can send its sensing data to the receiver of 381 meters away. Currently, most of the studies are focusing on independent detailed techniques for various optimization targets. It is hard to see a comprehensive system design fully meeting the requirements of the target use cases. However, the standardization of those technologies is agile and quick, as the industries usually follow some de facto standards. It means that many products in the market will follow even a private standard once it shows competitiveness in some applications.

Harmonic Backscatter Tags

FIG. 1A illustrates a schematic diagram of an RFID system 100. As depicted in FIG. 1A, the RFID system 100 comprises an RFID reader 110 and an RFID tag 120. The RFID tag 120 is configured as an RFID monostatic backscatter. The RFID reader 110 is also the tag illuminator and as such the RFID reader 110 needs to receive the back scattered (BS) signal from the RFID tag 120 at a frequency f0 while transmitting an activation signal at the same frequency f0 which is enabled, e.g., by expensive RF frontend with circulator.

Passive tags with illuminator harmonic generation are reported with aim to relax the tag reader full duplex challenges by receiving on a harmonic of the illumination frequency thereby removing the self-interference issues by frequency domain separation and filtering, which provides for significant cost reduction. This is depicted in FIG. 1B.

Figure 1B:
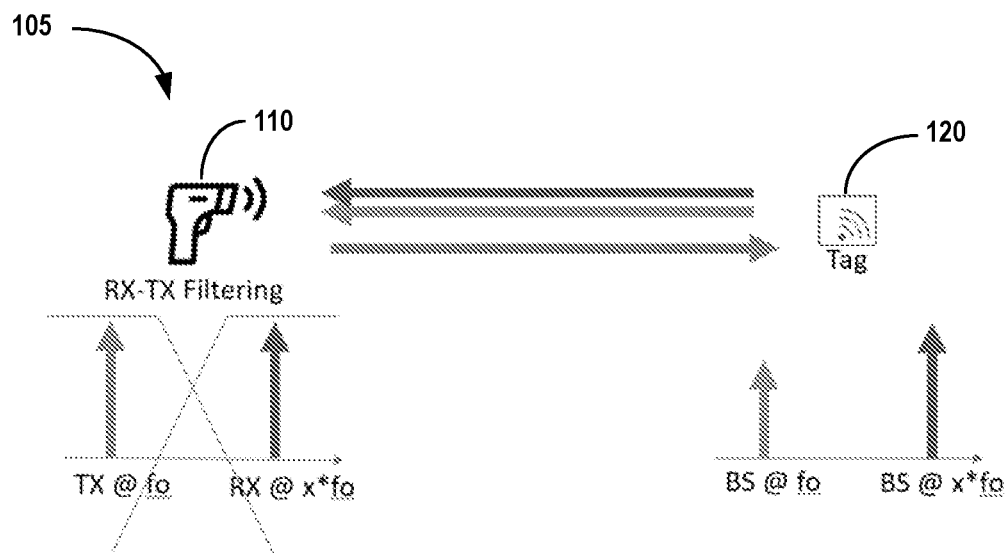
FIG. 1B illustrates a schematic diagram of anther RFID system.

FIG. 1B illustrates a schematic diagram of another RFID system 105. As depicted in FIG. 1B, the RFID reader 110 transmits an activation signal at a frequency f0 to the RFID tag 120. The RFID tag 120 transmits BS signals at the frequency f0 and at a frequency x*f0, where x is a positive integer which is equal to or greater than 2. Thus, the self-interference issues are removed.

For harmonic frequency backscattering tags, the level of the generated harmonic is highly dependent on the level of the illumination signal which again depends on the illuminator transmission power level, the distance between the illuminator and tag as well as the orientation of the tag (antenna gain in direction of the illuminator).

As such, some readers configured to be active for a tag positioning session may not be able to receive the harmonic signal generated by the tag which is a waste of resources. Implementations of the present disclosure provide a solution for adaptive configuration of multistatic harmonic tag backscatter so as to solve the above problems and one or more other potential problems. According to the solution, a network device transmits, to a passive illuminator, a request for transmitting an activation signal to a passive tag at a primary frequency and a first transmission power. The network device receives, from the passive illuminator, information about a harmonic frequency of the activation signal back-scattered from the passive tag, a received level of the harmonic and a distance between the illuminator and the passive tag. The received level of the harmonic is associated with a transmission power of the activation signal. The network device selects at least one reader for a passive tag which is expected to be within reach of the harmonic of the activation signal back-scattered from the passive tag based on a position of the illuminator for the passive tag, the received level of the harmonic and the distance. The network device configures the illuminator to transmit the activation signal to the passive tag at the primary frequency and with a transmission power ensuring maximum harmonic generation at the passive tag. The network device configures the at least one reader to receive the harmonic of the activation signal at the harmonic frequency.

With the solution, optimized selection of harmonic frequency for the tag multi-static backscatter is achieved. In addition, optimized selection of illumination power for adequate harmonic response level is achieved. Furthermore, optimized down selection of readers within reach of the tag harmonic backscatter signal is achieved.

Figure 2:
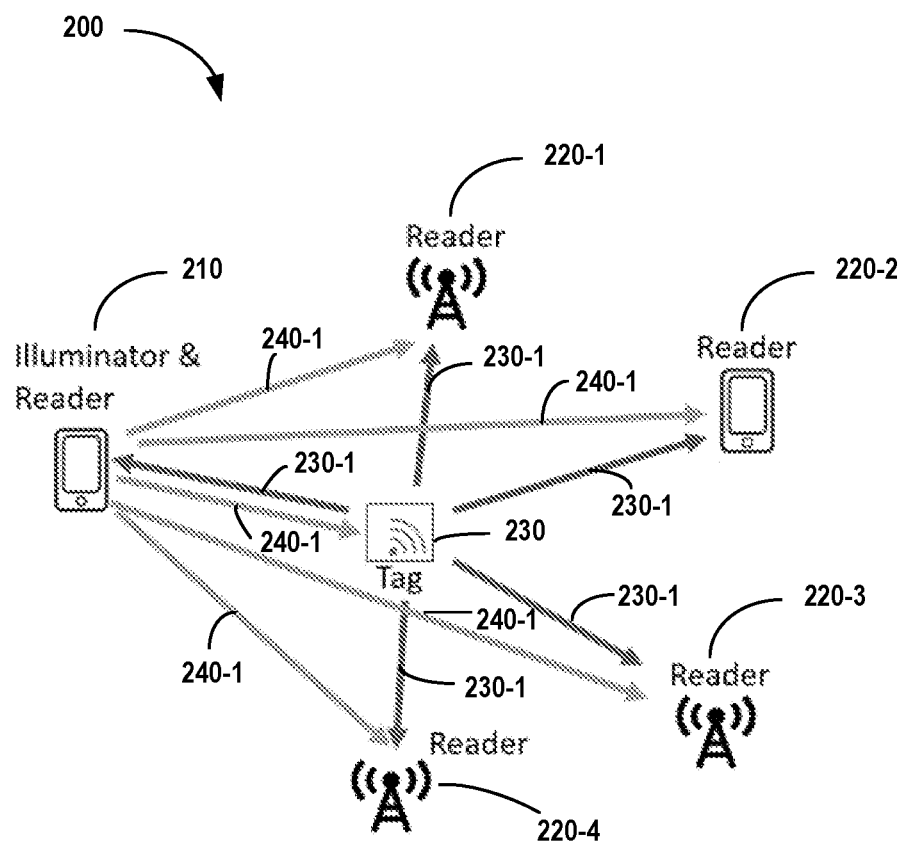
FIG. 2 illustrates an example communication network in which implementations of the present disclosure can be implemented.

FIG. 2 illustrates a schematic diagram of an example communication network 200 in which implementations of the present disclosure can be implemented. As shown in FIG. 2, the communication network 200 may comprise an illuminator 210 for a passive tag 230, readers 220-1, 220-2, 220-3 and 220-4 for the passive tag 230 as well as the passive tag 230. Hereinafter, for brevity, the illuminator 210 for the passive tag 230 is also referred to as illuminator 210. The readers 220-1, 220-2, 220-3 and 220-4 for the passive tag 230 may be collectively or individually referred to as reader 220 for the passive tag 230. Hereinafter, for brevity, the reader 220 for the passive tag 230 is also referred to as reader 220.

The illuminator 210 may transmit an activation signal 240-1 to the readers 220-1, 220-2, 220-3, 220-4 and the passive tag 230, respectively. The activation signal 240-1 may be received by both the tag 230, as intended, but also at the readers 220, as interference.

When the activation signal 240-1 interacts with an antenna of the passive tag 230, it will be scattered by the antenna in different directions. The scatter along an incident direction of the activation signal 240-1 is called backscatter.

In some embodiments, the reader 220 may be an access network device (for example, a gNB) or a terminal device. The readers 220-1, 220-2, 220-3 and 220-4 may receive a back-scattered signal 230-1 from the passive tag 230.

In some embodiments, the illuminator 210 may have full duplex hardware capabilities. In such embodiments, the illuminator 210 may also act as a reader receiving a back-scattered signal 230-5 from the passive tag 230.

The back-scattered signal 230-1 is generated from the activation signal 240-1. The back-scattered signal 230-1 is harmonic of the activation signal 240-5. Hereinafter, a harmonic of the activation signal is also referred to as a harmonics signal or back-scattered signal.

An activation signal may be decomposed into sine or cosine components with the same frequency as the activation signal and an integer multiple of a frequency of the activation signal. A sine or cosine component whose frequency is an integer multiple of the frequency of the activation signal is called a harmonic or harmonic signal. A harmonic frequency refers to a frequency of the harmonic. Hereinafter, a harmonic is also referred to as a back-scattered signal.

For the harmonic frequency backscattering tag, the level of the generated harmonic is highly dependent on the level of the activation signal which again depends on the transmission power level of the illuminator 210, a distance between the illuminator 210 and tag and the orientation of the passive tag 230 (antenna gain in direction of the illuminator 210).

It is to be understood that the number of the illuminator 210, the readers 220 and the passive tag 230 in FIG. 2 is given for the purpose of illustration without suggesting any limitations to the present disclosure. The communication network 200 may include any suitable number of devices adapted for implementing implementations of the present disclosure.

The communications in the communication network 200 may conform to any suitable standards including, but not limited to, Global System for Mobile Communications (GSM), LTE, LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 3:
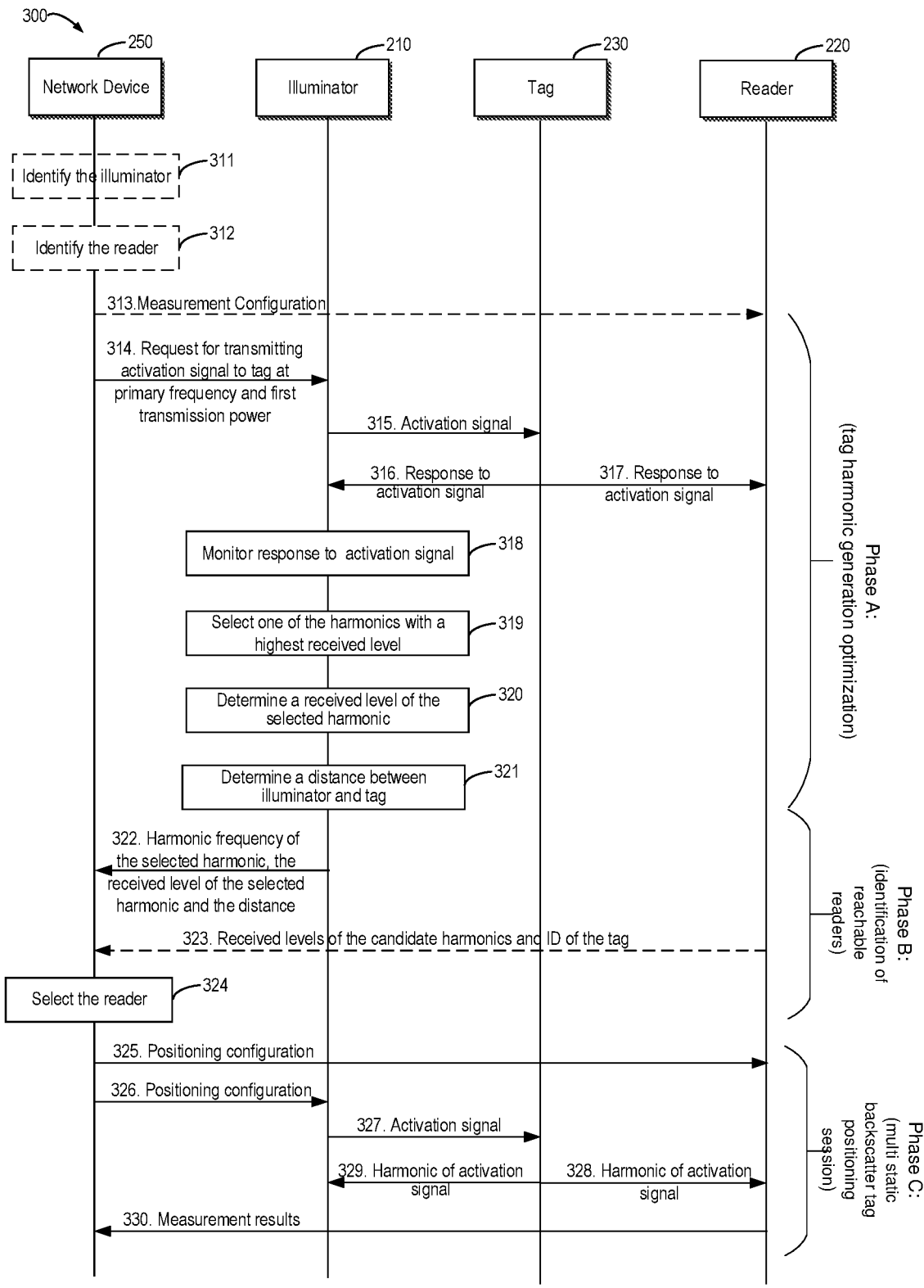
FIG. 3 illustrates a signaling chart illustrating a process for adaptive configuration of multistatic tag backscatter in accordance with some implementations of the present disclosure.

FIG. 3 illustrates a signaling chart illustrating a process 300 for adaptive configuration of multistatic harmonic tag backscatter in accordance with some implementations of the present disclosure. For the purpose of discussion, the process 300 will be described with reference to FIG. 2. The process 300 may involve the illuminator 210, the reader 220 and the passive tag 230 as shown in FIG. 2. The process 300 may also involve a network device 250 which is not shown in FIG. 2. In some embodiments, the network device 250 may be a Location Management Function (LMF) device.

Generally, the process 300 may comprise a phase A, a phase B and a phase C. In the phase A, tag harmonic generation optimization is performed. In the phase B, identification of reachable readers is performed. In the phase C, multistatic backscatter tag positioning session is performed. The phase A may comprise actions 311 to 321. The phase B may comprise actions 322 to 324. The phase C may comprise actions 325 to 330.

Specifically, as shown in FIG. 3, the network device 250 transmits 314, to the illuminator 210, a request for transmitting an activation signal to a passive tag 230 at a primary frequency and a first transmission power. Hereinafter, the request for transmitting the activation signal is also referred to as a tag positioning request. Hereinafter, the primary frequency and the first transmission power may be represented by f0 and Ptx0, respectively. In some embodiment, the first transmission power Ptx0 is below a maximum transmission power which the illuminator 210 is capable to transmit with.

In some embodiments, before transmitting the request to the illuminator 210, the network device 250 may determine 311 whether the illuminator 210 is expected to be in proximity of the passive tag 230. If the illuminator 210 is expected to be in proximity of the passive tag 230, the network device 250 transmits the request to the illuminator 210.

Upon receiving the request, the illuminator 210 transmits 315 the activation signal to the passive tag 230 at the primary frequency f0 and the first transmission power Ptx0 based on the request.

Upon receiving the activation signal, the passive tag 230 back-scatters 316, to the illuminator 210, a response to the activation signal including frequencies of harmonics of the activation signal. In other words, the passive tag 230 will also back-scatters the harmonics of the activation signal to the illuminator 210.

Similarly, the passive tag 230 back-scatters 317, to the reader 220, the response to the activation signal including the frequencies of harmonics of the activation signal. For example, the passive tag 230 back-scatters, to at least one of the readers 220-1, 220-2, 220-3 and 220-4, the response to the activation signal including the frequencies of harmonics of the activation signal. In other words, the passive tag 230 will also back-scatters the harmonics of the activation signal to the illuminator 210 and the at least one of the readers 220-1, 220-2, 220-3 and 220-4.

The frequencies of harmonics of the activation signal may be x*f0, where x is a positive integer which is equal to or greater than 2 and f0 is the primary frequency of the activation signal. For example, the passive tag 230 may back-scatter the harmonics of the activation signal at frequencies 2*f0 and 3*f0. In other words, the passive tag 230 may back-scatter a primary or fundamental frequency, a second order harmonic of the activation signal and a third order harmonic of the activation signal. For another example, the passive tag 230 may back-scatter the harmonics of the activation signal at frequencies 2*f0, 3*f0, 4*f0 and 5*f0.

Accordingly, the illuminator 210 monitors 318, from the passive tag 230, the response to the activation signal at the frequencies of harmonics of the activation signal.

Then, the illuminator 210 selects 319 one of the harmonics with a highest received level. Consider an example where the passive tag 230 back-scatters the harmonics of the activation signal at frequencies 2*f0 and 3*f0. If a received level of a harmonic of the activation signal at a frequency 2*f0 is the highest one of the received levels of the harmonics of the activation signal, the illuminator 210 selects the harmonic of the activation signal at the frequency 2*f0, i.e., the second order harmonic of the activation signal. Hereinafter, a harmonic frequency of the selected harmonic may be represented by fhx.

In turn, the illuminator 210 determines 320 a received level of the selected harmonic. The received level is associated with a transmission power of the activation signal.

In some embodiments, in order to determine the received level of the selected harmonic which is associated with a transmission power of the activation signal, the illuminator 210 may increase a transmission power of the activation signal from the first transmission power Ptx0 to the transmission power ensuring maximum harmonic generation at the passive tag. Then, the illuminator 210 may record the received level of the selected harmonic when the transmission power of the activation signal reaches the transmission power ensuring maximum harmonic generation at the passive tag.

Then, the illuminator 210 determines 321 a distance between the illuminator 210 and the passive tag 230.

In turn, the illuminator 210 transmits 322, to the network device 250, information about the harmonic frequency fhx of the selected harmonic, the received level of the selected harmonic and the distance.

In some embodiments, if there are no harmonic backscatter responses from the passive tag 230 or the harmonic backscatter responses from the passive tag 230 are too low, the process 300 may revert to the action 311 with another device identified as illuminator.

Upon receiving the information about the harmonic frequency fhx of the selected harmonic, the received level Prhx of the selected harmonic and the distance, the network device 250 selects 324 at least one of the readers 220 which is expected to be within reach of the harmonic of the activation signal back-scattered from the passive tag 230 based on a position of the illuminator 210, the received level of the harmonic and the distance.

In turn, the network device 250 configures the at least one reader 220 to receive the harmonic of the activation signal at the harmonic frequency. For example, the network device 250 may transmit 325 a first positioning configuration to the reader 220. The first positioning configuration indicates the harmonic frequency.

As described above, in some embodiments, the illuminator 210 may also act as a reader for a passive tag. In such embodiments, the network device 250 may configure the illuminator 210 to receive the harmonic of the activation signal at the harmonic frequency.

In addition, the network device 250 configures the illuminator 210 to transmit the activation signal to the passive tag 230 at the primary frequency and with a transmission power ensuring maximum harmonic generation at the passive tag. For example, the network device 250 may transmit 326 a second positioning configuration to the illuminator 210. The second positioning configuration indicates the primary frequency and a transmission power ensuring maximum harmonic generation at the passive tag. Upon receiving the second positioning configuration, the illuminator 210 transmits 327 the activation signal to the passive tag 230 at the primary frequency and with a transmission power ensuring maximum harmonic generation at the passive tag.

Upon receiving the activation signal, the passive tag 230 back-scatters 329 the primary and the harmonic of the activation signal to the illuminator 210. Similarly, the passive tag 230 back-scatters 328 the primary and harmonic of the activation signal to the reader 220.

Upon receiving the harmonic of the activation signal, the reader 220 performs measurement of the harmonic of the activation signal.

In turn, the reader 220 transmits 330, to the network device 250, measurement results of the harmonic for position estimation of the passive tag 230. For example, the measurement results may comprise at least one of the following: time of arrival (ToA), or angle of arrival (AoA).

Upon receiving the measurement results, the network device 250 may perform the position estimation of the passive tag 230 based on the measurement results.

In some embodiments, in order to increase likelihood of selecting (324) the reader for position estimation of the passive tag 230, more data from more measurement sources may be used.

In such embodiments, the network device 250 may identify 312 at least one candidate reader 220 which is expected to be in proximity of the passive tag 230.

Then, the network device 250 may configure the at least one candidate reader 220 to measure a set of candidate harmonics of the activation signal. The set of candidate harmonics may comprise the harmonic with the highest received level. For example, the network device 250 may transmit 313, to the at least one candidate reader 220, measurement configuration for measuring the set of candidate harmonics of the activation signal.

In some embodiments, the at least one candidate reader 220 configured at 313 may or may not be part of the readers configured at 325. For example, if a reader at 313 does not measure any signal from the passive tag 230, there is not a good reason for configuring the reader or any other reader in proximity of the reader again at 325.

Upon receiving the measurement configuration, the at least one candidate reader 220 measures received levels of the set of candidate harmonics of the activation signal based on the measurement configuration. In turn, the at least one candidate reader 220 transmits 323, to the network device 250, information about the received levels of the candidate harmonics and about an identity (ID) of the passive tag 230.

Upon receiving the information about the received levels of the candidate harmonics and about the ID of the passive tag 230, the network device 250 may select the at least one reader 220 based on the position of the illuminator 210, the received level of the harmonic, the distance and the received levels of the candidate harmonics.

It will be understood that the process 300 has been described by taking a network originated tag positioning request for example. In other embodiments, the tag positioning request (i.e., the request for transmitting an activation signal) may be transmitted by the reader 220.

With the process 300, optimized selection of harmonic frequency for the tag multi-static backscatter is achieved. In addition, optimized selection of illumination power for adequate harmonic response level is achieved. Furthermore, optimized down selection of readers within reach of the tag harmonic backscatter signal is achieved.

Hereinafter, details on harmonic tag illumination and backscatter reading will be described with reference to FIGS. 4 to 6.

Figure 4:
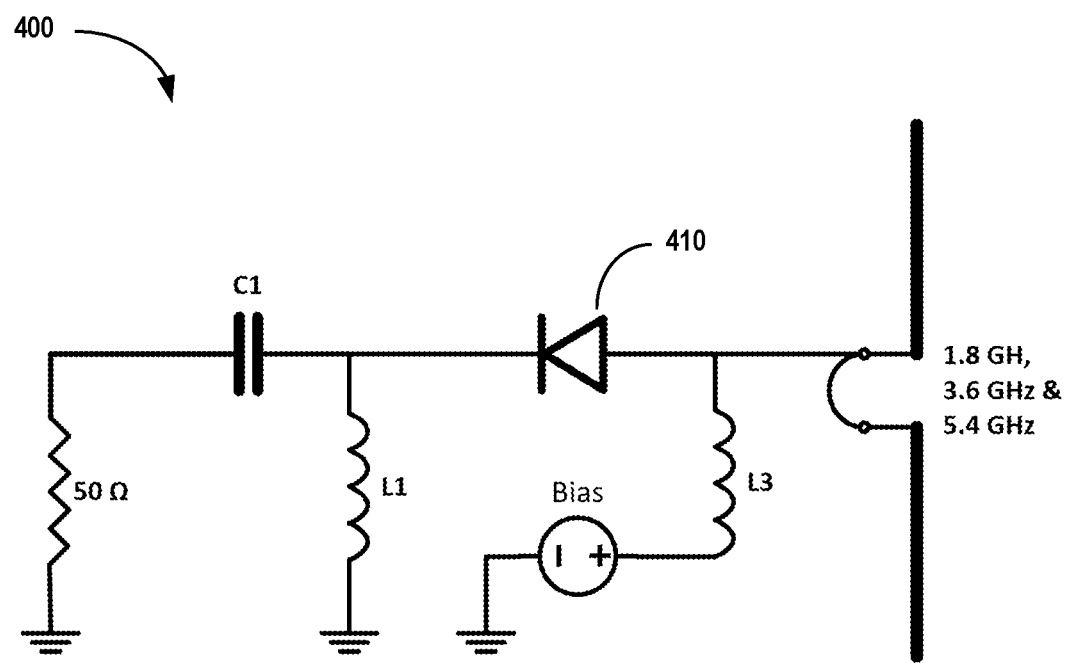
FIG. 4 illustrates a schematic diagram of a passive tag for generation of the second and third harmonics in accordance with some implementations of the present disclosure.

FIG. 4 illustrates a schematic diagram of a passive tag 400 for generation of the second order and third order harmonics in accordance with some implementations of the present disclosure. In some embodiments, the passive tag 400 may be implemented as the passive tag 230 as shown in FIG. 2.

Harmonic generation at the passive tag 400 may be achieved by deliberately optimizing the condition of the active modulation device (diode or transistor) for high harmonic generation. A simple hardware architecture supporting this is illustrated in FIG. 4 below for a passive tag 400. The primary transmit frequency (f0) used by an illuminator for a passive tag is 1.8 GHz in the example.

The antenna at the passive tag 400 will be matched to 50Ω when a PIN diode 410 is forward biased (open) and thereby not reflecting (backscattering) the illuminator signal f0 or any harmonics for that matter. The PIN diode 410 will be closed when the bias voltage is reversed and the antenna will be mis-matched and reflect the primary illuminator frequency f0 and harmonics f2, f3 and so on. The power level of the harmonic signals will depend on the capabilities of the passive tag antenna (the ability the radiate at the harmonic frequencies), the RF load seen at the PIN diode 410 at the harmonic frequencies and of course the design of the active component. Optimizing the passive tag 400 for single harmonic operation (f2 or f3) will also optimize the absolute power level of the harmonic component, as optimizing for multiple harmonics will always compromise the absolute power level of each harmonic component. The inherent power level of the third order harmonic component is relatively high for the passive tag 400 without any special considerations as a dipole antenna will naturally be an efficient radiator at the third order harmonic. However, the highest power level can typically be obtained at the second order harmonic if the passive tag 400 is optimized for that. The power level of the harmonic frequencies will increase as the power level of the incoming primary activation signal increases. However, the active component generating the harmonics may come into compression, whereby an increased power level of the incoming primary activation signal will not increase to power level of the harmonic signals anymore.

Figure 5:
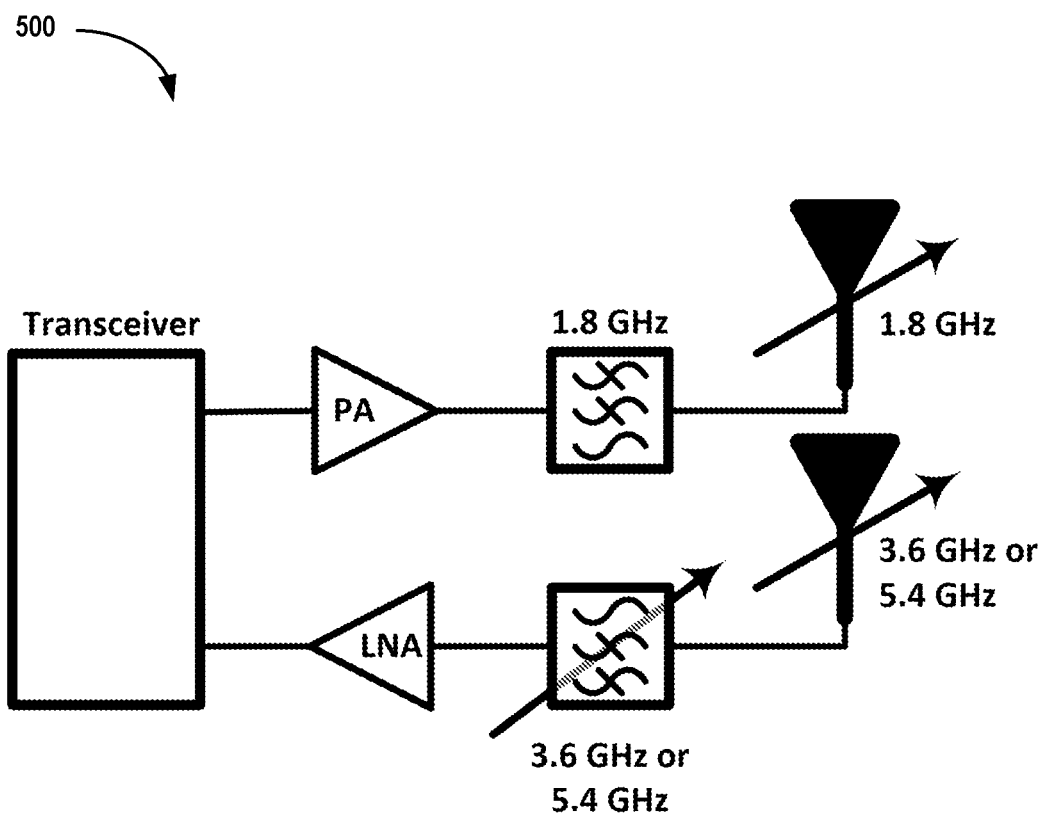
FIG. 5 illustrates a schematic diagram of a hardware architecture of an illuminator for a passive tag in accordance with some implementations of the present disclosure.

The illuminator could be an NR 5G smart phone, which supports multiple 3GGP specified bands or a dedicated device with added receiver capabilities at the second and third order harmonic frequencies of the frequency of the illuminator Tx signal, as shown in FIG. 5 below.

FIG. 5 illustrates a schematic diagram of a hardware architecture of an illuminator 500 for a passive tag in accordance with some implementations of the present disclosure. The illuminator is also referred to as an activator. The capabilities of receiving the second order and the third order harmonics could be sequentially, as shown in FIG. 5 or simultaneously depending on the illuminator RF capabilities.

Figure 6:
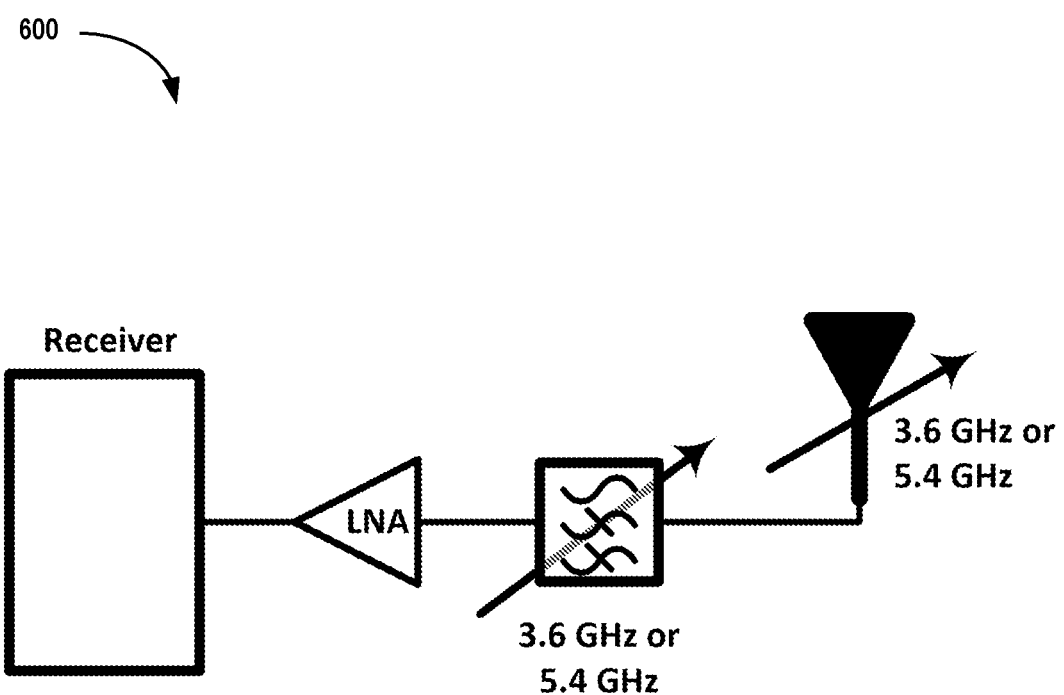
FIG. 6 illustrates a schematic diagram of a reader for a passive tag with stand-alone RF receiver architecture in accordance with some implementations of the present disclosure.

FIG. 6 illustrates a schematic diagram of a reader 600 for a passive tag with stand-alone RF receiver architecture in accordance with some implementations of the present disclosure. The reader 600 may be implemented as the reader 220 as shown in FIG. 2. The reader could also be implemented with transmit capabilities, with a hardware architecture similar to that of the illuminator shown in FIG. 5.

The reader 600 will typically be a device with high gain antennas to increase the detection range and could in theory be a stand-alone RF receiver communicating with the LMF via a wired connection, as shown in FIG. 6.

Figure 7:
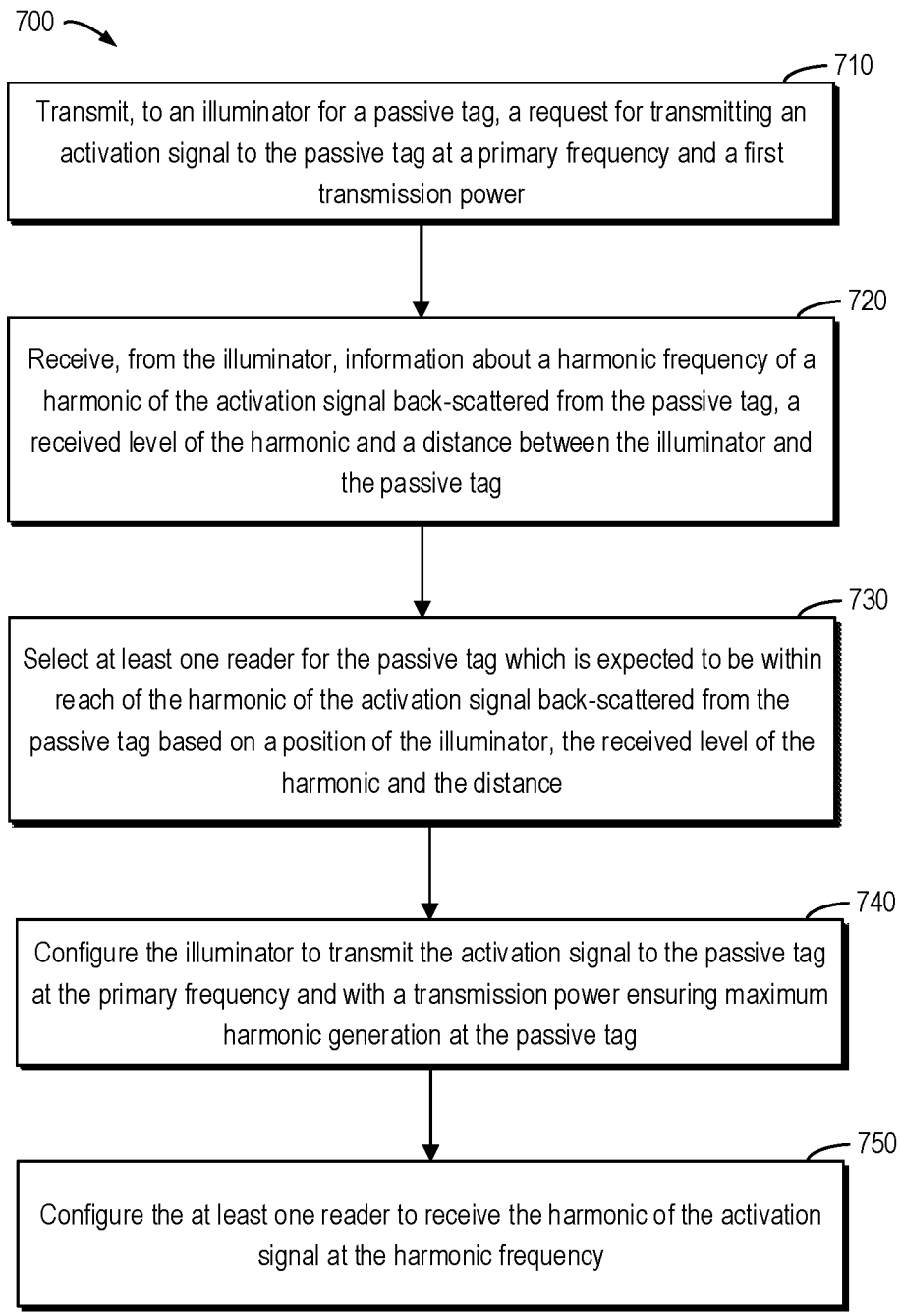
FIG. 7 illustrates a flowchart of an example method in accordance with some implementations of the present disclosure.

FIG. 7 illustrates a flowchart of an example method 700 in accordance with some implementations of the present disclosure. For the purpose of discussion, the method 700 will be described from the perspective of the network device 250 with reference to FIG. 3.

At block 710, the network device 250 transmits, to an illuminator for a passive tag, a request for transmitting an activation signal to a passive tag at a primary frequency and a first transmission power.

At block 720, the network device 250 receives, from the illuminator for the passive tag, information about a harmonic frequency of a harmonic of the activation signal back-scattered from the passive tag, a received level of the harmonic and a distance between the illuminator for the passive tag and the passive tag, the received level of the harmonic being associated with a transmission power of the activation signal.

At block 730, the network device 250 selects at least one reader for a passive tag which is expected to be within reach of the harmonic of the activation signal back-scattered from the passive tag based on a position of the illuminator for the passive tag, the received level of the harmonic and the distance;

At block 740, the network device 250 configures the illuminator for the passive tag to transmit the activation signal to the passive tag at the primary frequency and with a transmission power ensuring maximum harmonic generation at the passive tag.

At block 750, the network device 250 configures the at least one reader for the passive tag to receive the harmonic of the activation signal at the harmonic frequency.

In some embodiments, the method 700 further comprises: receiving measurement results of the harmonic from the at least one reader; and estimating a position of the passive tag based on the measurement results.

In some embodiments, the method 700 further comprises: identifying at least one candidate reader for the passive tag which is expected to be in proximity of the passive tag; configuring the at least one candidate reader to measure a set of candidate harmonics of the activation signal; receiving, from the at least one candidate reader, information about received levels of the candidate harmonics measured by the at least one candidate reader and about an identity of the passive tag.

In some embodiments, selecting the at least one reader comprises: selecting the at least one reader based on the position of the illuminator, the received level of the harmonic, the distance between the illuminator and the passive tag and the received levels of the candidate harmonics.

In some embodiments, the method 700 further comprises: identifying the illuminator which is expected to be in proximity of the passive tag.

Figure 8:
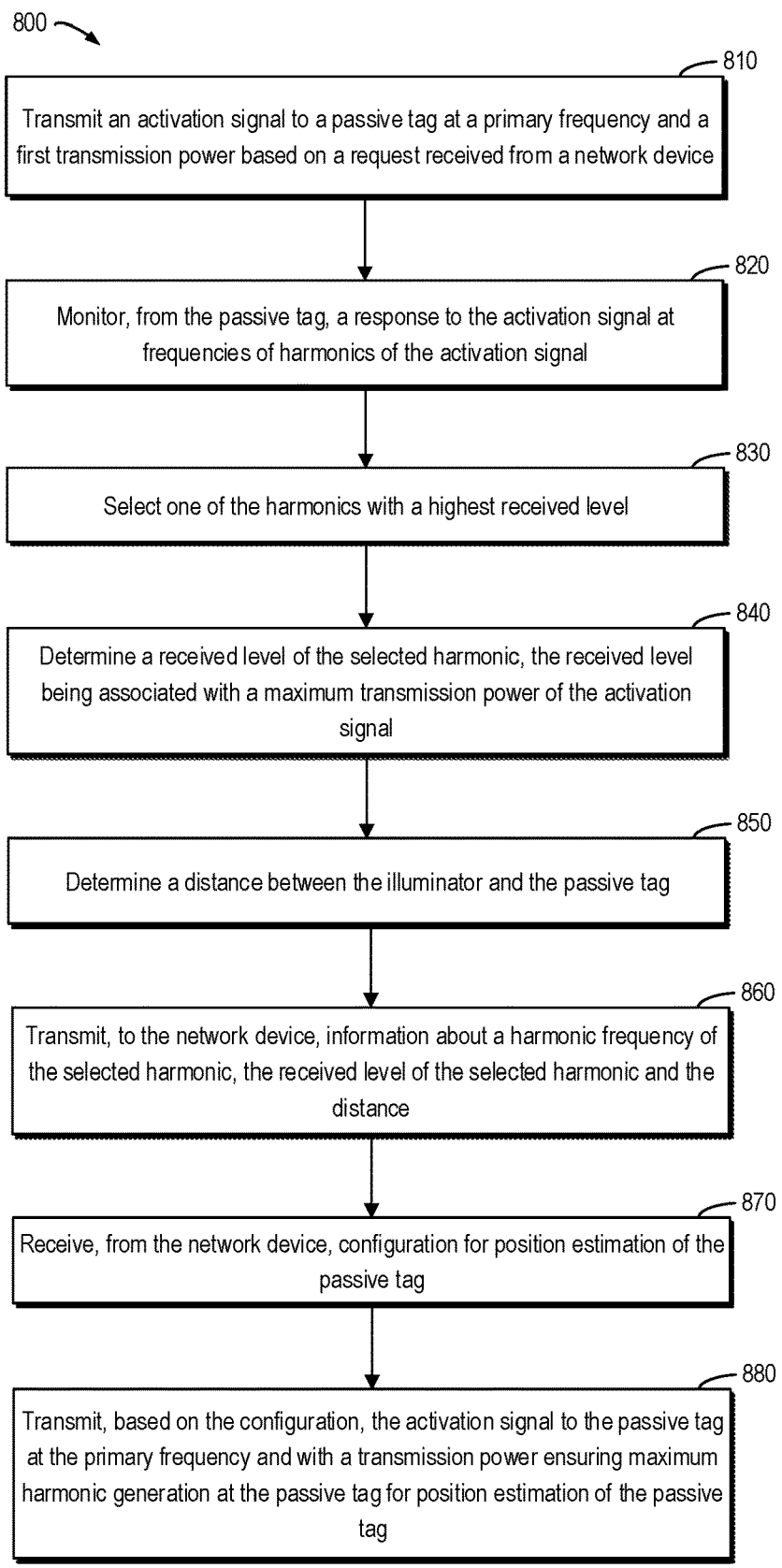
FIG. 8 illustrates a flowchart of an example method in accordance with some other implementations of the present disclosure.

FIG. 8 illustrates a flowchart of an example method 800 in accordance with some implementations of the present disclosure. For the purpose of discussion, the method 800 will be described from the perspective of the illuminator 210 for the passive tag 230 with reference to FIG. 2.

At block 810, the illuminator 210 transmits an activation signal to a passive tag at a primary frequency and a first transmission power based on a request received from a network device.

At block 820, the illuminator 210 monitors, from the passive tag, a response to the activation signal at frequencies of harmonics of the activation signal.

At block 830, the illuminator 210 selects one of the harmonics with a highest received level.

At block 840, the illuminator 210 determines a received level of the selected harmonic, the received level being associated with a transmission power of the activation signal.

At block 850, the illuminator 210 determines a distance between the illuminator for the passive tag and the passive tag.

At block 860, the illuminator 210 transmits, to the network device, information about a harmonic frequency of the selected harmonic, the received level of the selected harmonic and the distance.

At block 870, the illuminator 210 receives, from the network device, configuration for position estimation of the passive tag.

At block 880, the illuminator 210 transmits, based on the configuration, the activation signal to the passive tag at the primary frequency and with a transmission power ensuring maximum harmonic generation at the passive tag for position estimation of the passive tag.

In some embodiments, the first transmission power is below the maximum transmission power.

In some embodiments, the method 800 further comprises: increasing the first transmission power until a maximum response is detected.

Figure 9:
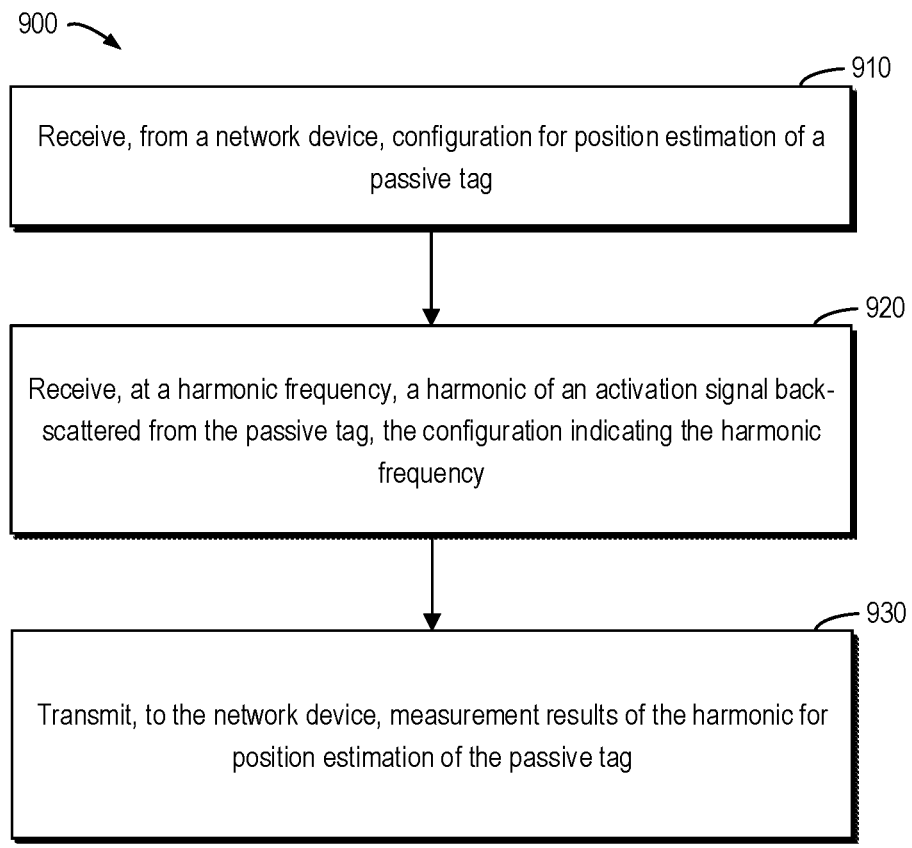
FIG. 9 illustrates a flowchart of an example method in accordance with still other implementations of the present disclosure.

FIG. 9 illustrates a flowchart of an example method 900 in accordance with some implementations of the present disclosure. For the purpose of discussion, the method 900 will be described from the perspective of the reader 220 for the passive tag 230 with reference to FIG. 2.

At block 910, the reader 220 receives, from a network device, configuration for position estimation of a passive tag.

At block 920, the reader 220 receives, at a harmonic frequency, a harmonic of an activation signal back-scattered from the passive tag, the configuration indicating the harmonic frequency.

At block 930, the reader 220 transmits, to the network device, measurement results of the harmonic for position estimation of the passive tag.

In some embodiments, the method 900 further comprises: receiving measurement configuration from the network device; measuring received levels of a set of candidate harmonics of the activation signal based on the measurement configuration; and transmitting, to the network device, information about the received levels of the candidate harmonics and about an identity of the passive tag.

In some example implementations, an apparatus capable of performing any of the method 700 (for example, the network device 250) may comprise means for performing the respective steps of the method 700. The means may be implemented in any suitable form. For example, the means may be implemented in a circuitry or software module.

In some example implementations, the apparatus comprises: means for transmitting, from a network device to an illuminator for a passive tag, a request for transmitting an activation signal to the passive tag at a primary frequency and a first transmission power; means for receiving, from the illuminator, information about a harmonic frequency of a harmonic of the activation signal back-scattered from the passive tag, a received level of the harmonic and a distance between the illuminator and the passive tag, the received level of the harmonic being associated with a transmission power of the activation signal; means for selecting at least one reader for the passive tag which is expected to be within reach of the harmonic of the activation signal back-scattered from the passive tag based on a position of the illuminator, the received level of the harmonic and the distance; means for configuring the illuminator to transmit the activation signal to the passive tag at the primary frequency and with a transmission power ensuring maximum harmonic generation at the passive tag; and means for configuring the at least one reader to receive the harmonic of the activation signal at the harmonic frequency.

In some embodiments, the apparatus further comprises: means for receiving measurement results of the harmonic from the at least one reader; and means for estimating a position of the passive tag based on the measurement results.

In some embodiments, the apparatus further comprises: means for identifying at least one candidate reader for the passive tag which is expected to be in proximity of the passive tag; means for configuring the at least one candidate reader to measure a set of candidate harmonics of the activation signal; means for receiving, from the at least one candidate reader, information about received levels of the candidate harmonics measured by the at least one candidate reader and about an identity of the passive tag.

In some embodiments, means for selecting the at least one reader comprises: means for selecting the at least one reader based on the position of the illuminator, the received level of the harmonic, the distance between the illuminator and the passive tag and the received levels of the candidate harmonics.

In some embodiments, the apparatus further comprises: means for identifying the illuminator which is expected to be in proximity of the passive tag.

In some example implementations, an apparatus capable of performing any of the method 800 (for example, the illuminator 210 for the passive tag 230) may comprise means for performing the respective steps of the method 800. The means may be implemented in any suitable form. For example, the means may be implemented in a circuitry or software module.

In some example implementations, the apparatus comprises: means for transmitting an activation signal from an illuminator for a passive tag to the passive tag at a primary frequency and a first transmission power based on a request received from a network device; means for monitoring, from the passive tag, a response to the activation signal at frequencies of harmonics of the activation signal; means for selecting one of the harmonics with a highest received level; means for determining a received level of the selected harmonic, the received level being associated with a transmission power of the activation signal; means for determining a distance between the illuminator and the passive tag; means for transmitting, to the network device, information about a harmonic frequency of the selected harmonic, the received level of the selected harmonic and the distance; means for receiving, from the network device, configuration for position estimation of the passive tag; and means for transmitting, based on the configuration, the activation signal to the passive tag at the primary frequency and with a transmission power ensuring maximum harmonic generation at the passive tag for position estimation of the passive tag.

In some embodiments, the first transmission power is below the maximum transmission power.

Figure 10:
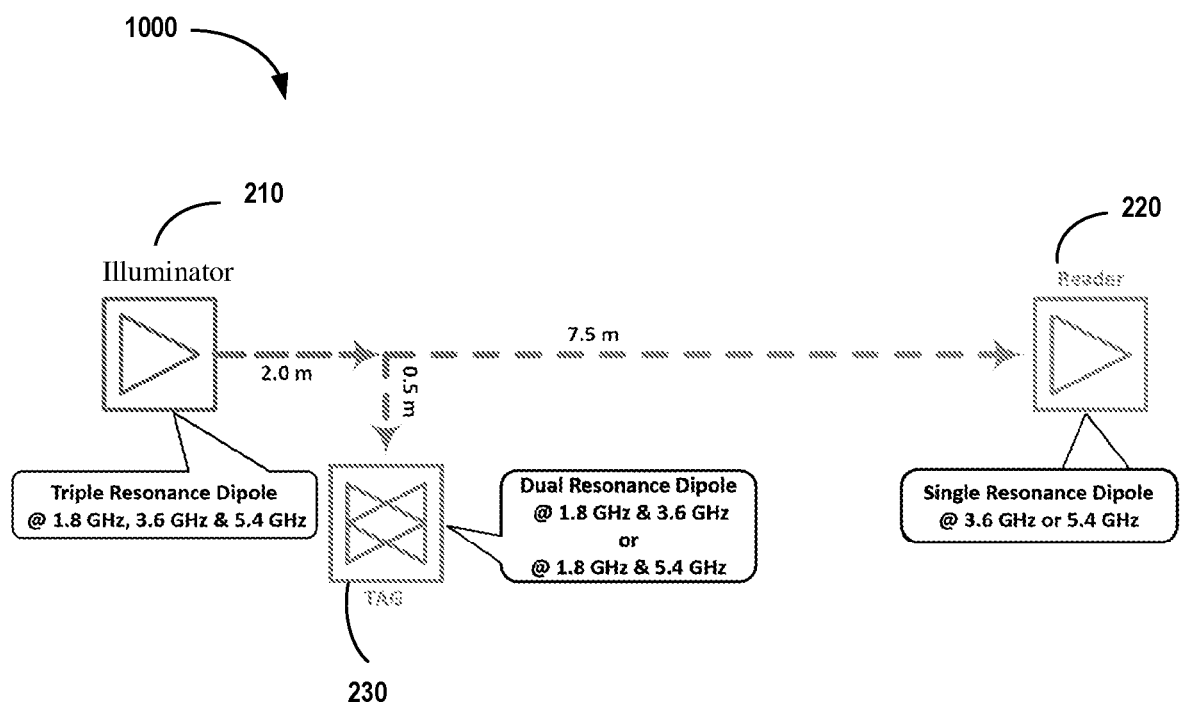
FIG. 10 illustrates a test setup for simulation in accordance with some implementations of the present disclosure.

Link level like simulations have been performed in CST (electromagnetic simulator) for the set up shown in FIG. 10. The relative short distance between the illuminator and the Reader (7.5 m) has been chosen to limit the number of required mesh-cells in CST (and thereby computer requirements) as CST is not intendent for such simulations.

Figure 11A:
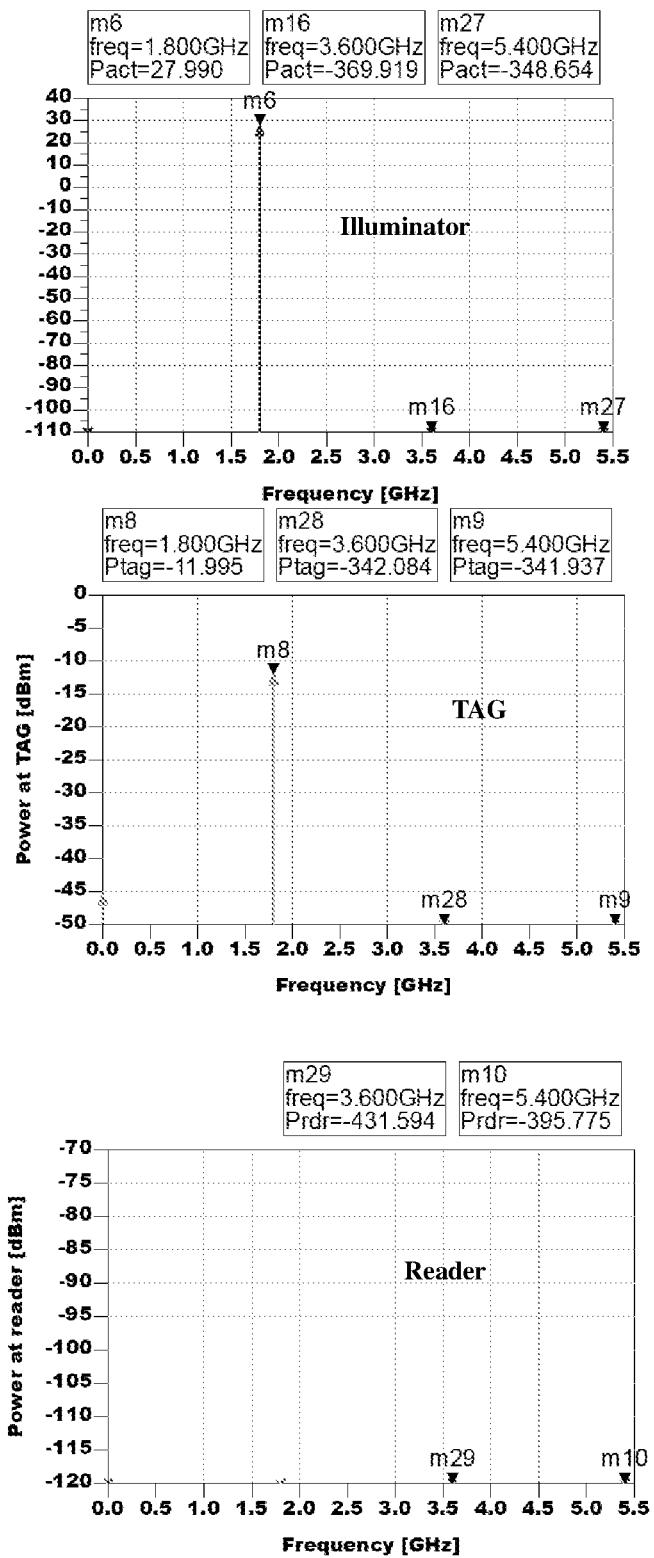
FIGS. 11A, 11B and 11C illustrate simulation results in accordance with some implementations of the present disclosure, respectively.
Figure 11B:
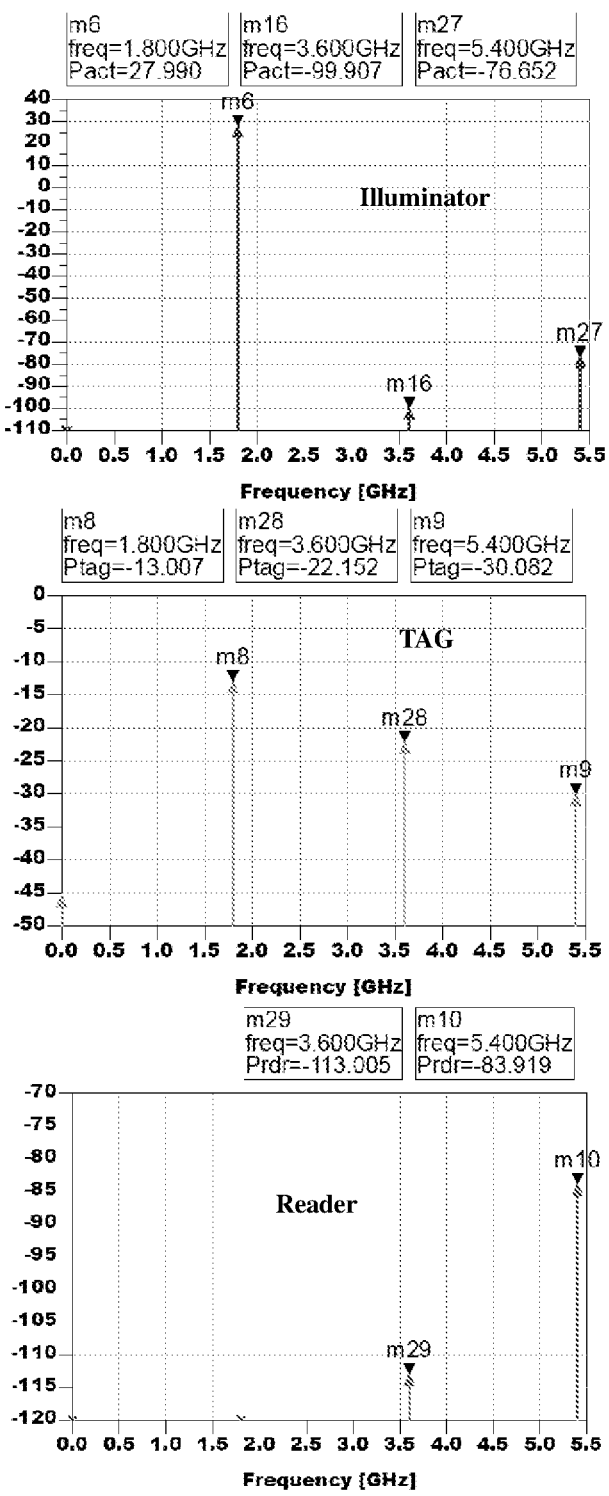
Figure 11C:
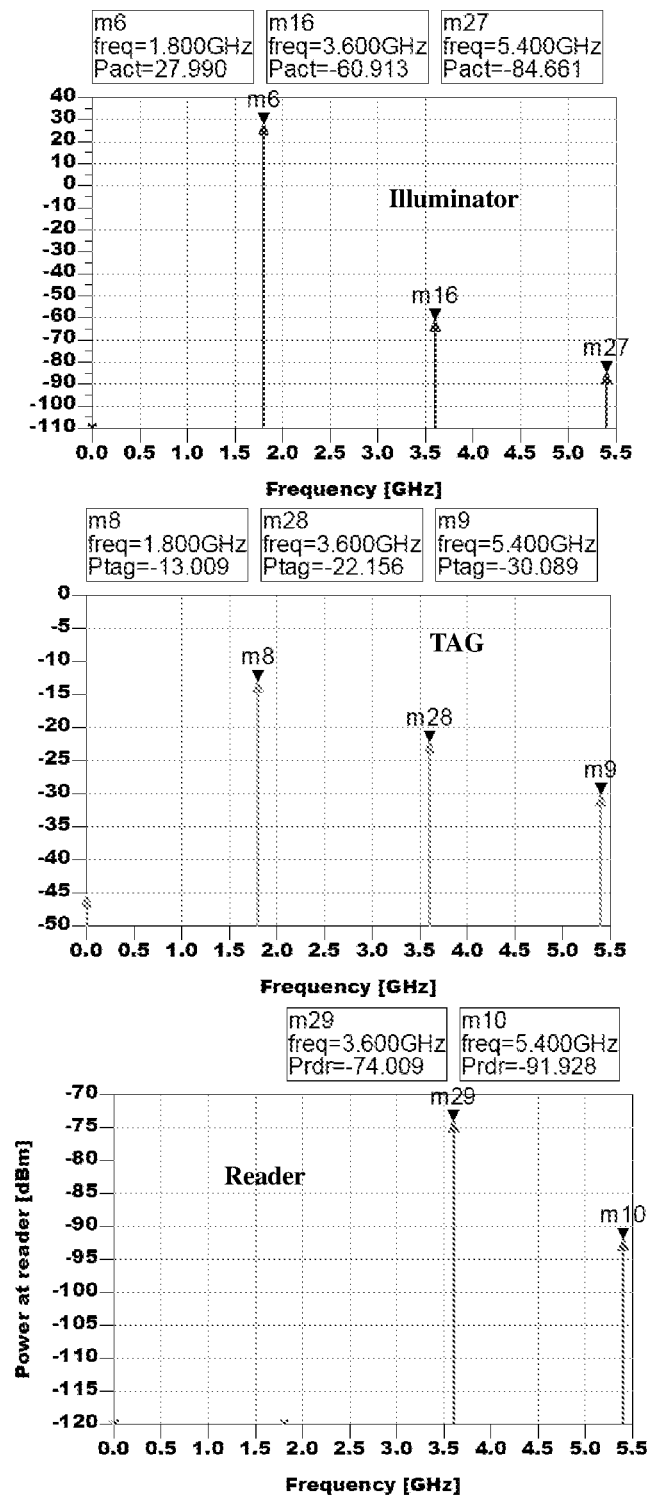

FIGS. 11A, 11B and 11C illustrate simulation results in accordance with some implementations of the present disclosure, respectively. Two set of simulation results are shown in FIGS. 11A, 11B and 11C, where the passive tag 230 is optimized for generating and radiate a second order harmonic and a third order harmonic, respectively.

FIG. 11A shows a case where the antenna on the passive tag 230 is matched and not reflecting any signals. FIG. 11B shows a case where the passive tag 230 is reflective and optimized for the third order harmonic. FIG. 11C shows a case where the passive tag 230 is reflective and optimized for the second order harmonic.

In FIGS. 11A, 11B and 11C, different link level like results are obtained in CST. In FIGS. 11A, 11B and 11C, m16 represents that the passive tag 230 is reflecting the illuminator signal and optimized for the second order harmonic, m27 represents that the passive tag 230 is reflecting the illuminator signal and optimized for the third order harmonic. In FIGS. 11A, 11B and 11C, m8, m9, m10, m 28 and m29 represent that the passive tag 230 is absorptive and not reflecting the illuminator signal.

The power level results from FIGS. 11A, 11B and 11C are summarized in Table 1 below.

TABLE 1

|  | Illuminator | | TAG | | Reader | |
| --- | --- | --- | --- | --- | --- | --- |
|  | $2^{nd}$ | $3^{rd}$ | $2^{nd}$ | $2^{nd}$ | $3^{rd}$ | $2^{nd}$ |
| Absorptive TAG | −370 dBm | −349 dBm | −342 dBm | −342 dBm | −431 dBm | −396 dBm |
| Reflective TAG for $2^{nd}$ | −100 dBm | −77 dBm | −22 dBm | −30 dBm | −113 dBm | −83 dBm |
| Reflective TAG for $3^{rd}$ | −61 dBm | −84 dBm | −22 dBm | −30 dBm | −74 dBm | −92 dBm |

In some embodiments, the apparatus further comprises: means for increasing the first transmission power until a maximum response is detected.

In some example implementations, an apparatus capable of performing any of the method 900 (for example, the reader 220 for the passive tag 230) may comprise means for performing the respective steps of the method 900. The means may be implemented in any suitable form. For example, the means may be implemented in a circuitry or software module.

In some example implementations, the apparatus comprises: means for receiving, at a reader for a passive tag from a network device, configuration for position estimation of the passive tag; means for receiving, at a harmonic frequency, a harmonic of an activation signal back-scattered from the passive tag, the configuration indicating the harmonic frequency; and means for transmitting, to the network device, measurement results of the harmonic for position estimation of the passive tag.

In some embodiments, the apparatus further comprises: means for receiving measurement configuration from the network device; measuring received levels of a set of candidate harmonics of the activation signal based on the measurement configuration; and transmitting, to the network device, information about the received levels of the candidate harmonics and about an identity of the passive tag.

It can be seen from Table 1 as well as FIGS. 11A, 11B and 11C that the capability of harmonic back scattering from the passive tag 230 can be detected at the illuminator and communicated to the reader 220 via the LMF 250.

Figure 12:
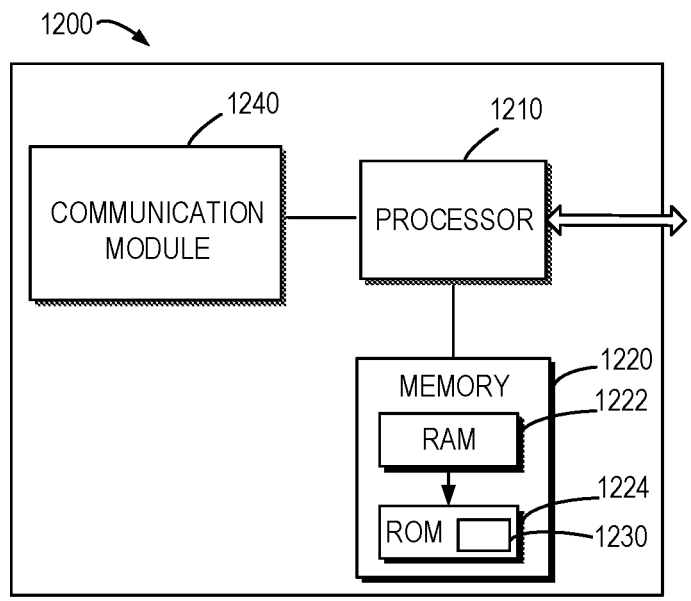
FIG. 12 illustrates a simplified block diagram of an apparatus that is suitable for implementing embodiments of the present disclosure.

FIG. 12 is a simplified block diagram of a device 1200 that is suitable for implementing embodiments of the present disclosure. The device 1200 may be provided to implement the communication device, for example, the network device 250, the illuminator 210 or the reader 220 as shown in FIG. 3. As shown, the device 1200 includes one or more processors 1210, one or more memories 1220 coupled to the processor 1210, and one or more communication modules 1240 coupled to the processor 1210.

The communication module 1240 is for bidirectional communications. The communication module 1240 has at least one antenna to facilitate communication. The communication interface may represent any interface that is necessary for communication with other network elements.

The processor 1210 may be of any type suitable to the local technical network and may include one or more of the following: general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

The memory 1220 may include one or more non-volatile memories and one or more volatile memories. Examples of the non-volatile memories include, but are not limited to, a Read Only Memory (ROM) 1224, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1222 and other volatile memories that will not last in the power-down duration.

A computer program 1230 includes computer executable instructions that are executed by the associated processor 1210. The program 1230 may be stored in the ROM 1224. The processor 1210 may perform any suitable actions and processing by loading the program 1230 into the RAM 1222.

The embodiments of the present disclosure may be implemented by means of the program 1230 so that the device 1200 may perform any process of the disclosure as discussed with reference to FIGS. 2 to 11C. The embodiments of the present disclosure may also be implemented by hardware or by a combination of software and hardware.

Figure 13:
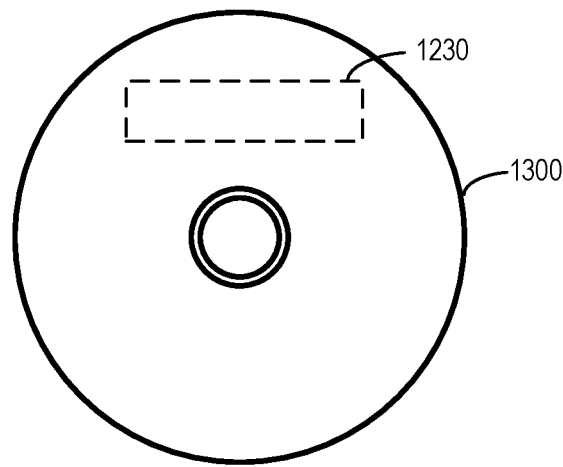
FIG. 13 illustrates a block diagram of an example computer readable medium in accordance with some implementations of the present disclosure.

In some example embodiments, the program 1230 may be tangibly contained in a computer readable medium which may be included in the device 1200 (such as in the memory 1220) or other storage devices that are accessible by the device 1200. The device 1200 may load the program 1230 from the computer readable medium to the RAM 1222 for execution. The computer readable medium may include any types of tangible non-volatile storage, such as ROM, EPROM, a flash memory, a hard disk, CD, DVD, and the like. FIG. 13 shows an example of the computer readable medium 1300 in form of CD or DVD. The computer readable medium has the program 1230 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 700, 800 and 900 as described above with reference to FIGS. 7 to 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

LIST OF ACRONYMS AND ABBREVIATIONS

NW NetWork
UE User Equipment
gNB 5G Base Station
LMF Location Management Function
IoT Internet of Things
NB-IoT Narrow Band Internet of Things
eMTC enhanced Machine-Type Communication
RedCap reduced capabilities
RFID Radio Frequency Identification
LORA Long Range

What is claimed is:

1. A network device, comprising:
at least one processor; and
at least one memory including computer program code;
wherein the at least one memory and the computer program code are configured to, with the at least one processor, cause the network device to:
transmit, to an illuminator for a passive tag, a request for transmitting an activation signal to the passive tag at a primary frequency and a first transmission power;
receive, from the illuminator, information about a harmonic frequency of a harmonic of the activation signal back-scattered from the passive tag, a received level of the harmonic and a distance between the illuminator and the passive tag, the received level of the harmonic being associated with a transmission power of the activation signal;
select at least one reader for the passive tag which is expected to be within reach of the harmonic of the activation signal back-scattered from the passive tag based on a position of the illuminator, the received level of the harmonic and the distance;
configure the illuminator to transmit the activation signal to the passive tag at the primary frequency and with a transmission power ensuring maximum harmonic generation at the passive tag; and
configure the at least one reader to receive the harmonic of the activation signal at the harmonic frequency.

2. The network device of claim 1, wherein the network device is further caused to:
receive measurement results of the harmonic from the at least one reader; and
estimate a position of the passive tag based on the measurement results.

3. The network device of claim 1, wherein the network device is further caused to:
identify at least one candidate reader for the passive tag which is expected to be in proximity of the passive tag;
configure the at least one candidate reader to measure a set of candidate harmonics of the activation signal;
receive, from the at least one candidate reader, information about received levels of the candidate harmonics measured by the at least one candidate reader and about an identity of the passive tag; and
wherein the network device is caused to select the at least one reader based on the position of the illuminator, the received level of the harmonic, the distance between the illuminator and the passive tag and the received levels of the candidate harmonics.

4. The network device of claim 1, wherein the network device is further caused to:
identify the illuminator which is expected to be in proximity of the passive tag.

5. An illuminator for a passive tag, comprising:
at least one processor; and
at least one memory including computer program code;
wherein the at least one memory and the computer program code are configured to, with the at least one processor, cause the illuminator to:
transmit an activation signal to the passive tag at a primary frequency and a first transmission power based on a request received from a network device;
monitor, from the passive tag, a response to the activation signal at frequencies of harmonics of the activation signal;
select one of the harmonics with a highest received level;
determine a received level of the selected harmonic, the received level being associated with a transmission power of the activation signal;
determine a distance between the illuminator and the passive tag;
transmit, to the network device, information about a harmonic frequency of the selected harmonic, the received level of the selected harmonic and the distance;
receive, from the network device, configuration for position estimation of the passive tag; and
transmit, based on the configuration, the activation signal to the passive tag at the primary frequency and with a transmission power ensuring maximum harmonic generation at the passive tag for position estimation of the passive tag.

6. The illuminator of claim 5, wherein the first transmission power is below the maximum transmission power; and
wherein the illuminator is further caused to increase the first transmission power until a maximum response is detected.

7. A reader for a passive tag, comprising:
at least one processor; and
at least one memory including computer program code;
wherein the at least one memory and the computer program code are configured to, with the at least one processor, cause the reader to:
receive, from a network device, configuration for position estimation of the passive tag;
receive, at a harmonic frequency, a harmonic of an activation signal back-scattered from the passive tag, the configuration indicating the harmonic frequency; and
transmit, to the network device, measurement results of the harmonic for position estimation of the passive tag.

8. The reader of claim 7, wherein the reader is further caused to:
receive measurement configuration from the network device;
measure received levels of a set of candidate harmonics of the activation signal based on the measurement configuration; and
transmit, to the network device, information about the received levels of the candidate harmonics and about an identity of the passive tag.

* * * * *